US011926428B2

(12) United States Patent
Buchmueller et al.

(10) Patent No.: US 11,926,428 B2
(45) Date of Patent: Mar. 12, 2024

(54) PROPELLER SAFETY FOR AUTOMATED AERIAL VEHICLES

(71) Applicant: Amazon Technologies, Inc., Seattle, WA (US)

(72) Inventors: Daniel Buchmueller, Seattle, WA (US); Brian C. Beckman, Newcastle, WA (US); Amir Navot, Seattle, WA (US); Brandon William Porter, Yarrow Point, WA (US); Gur Kimchi, Seattle, WA (US); Jeffrey P. Bezos, Greater Seattle Area, WA (US); Frederik Schaffalitzky, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 449 days.

(21) Appl. No.: 17/000,879

(22) Filed: Aug. 24, 2020

(65) Prior Publication Data
US 2020/0385134 A1 Dec. 10, 2020

Related U.S. Application Data

(63) Continuation of application No. 14/491,215, filed on Sep. 19, 2014, now Pat. No. 10,780,988.
(Continued)

(51) Int. Cl.
*B64D 31/06* (2006.01)
*B64C 11/00* (2006.01)
(Continued)

(52) U.S. Cl.
CPC ............. *B64D 31/06* (2013.01); *B64C 11/00* (2013.01); *B64C 39/02* (2013.01); *B64C 39/024* (2013.01);
(Continued)

(58) Field of Classification Search
CPC ............ B64D 2045/0095; B64D 31/06; B64D 31/14; B64D 1/12; B64D 27/24;
(Continued)

(56) References Cited

U.S. PATENT DOCUMENTS 3,417,729 A 12/1968 Gilday et al.
3,575,527 A 4/1971 Sumitani et al.
(Continued)

FOREIGN PATENT DOCUMENTS

CN 101385059 A 3/2009
CN 103224026 A 7/2013
(Continued)

OTHER PUBLICATIONS

Andrew Amato, "Parrot Announces New Bobop Drone", Dronelife. com, May 12, 2014; http://dronelife.com/2014/05/12/parrot-announces-new-bebop-drone/, accessed Dec. 21, 2016.
(Continued)

*Primary Examiner* — Assres H Woldemaryam
(74) *Attorney, Agent, or Firm* — Athorus, PLLC

(57) ABSTRACT

The disclosure describes an automated aerial vehicle (AAV) and system for automatically detecting a contact or an imminent contact between a propeller of the AAV and an object (e.g., human, pet, or other animal). When a contact or an imminent contact is detected, a safety profile may be executed to reduce or avoid any potential harm to the object and/or the AAV. For example, if a contact with a propeller of the AAV by an object is detected, the rotation of the propeller may be stopped to avoid harming the object. Likewise, an object detection component may be used to detect an object that is nearing a propeller, stop the rotation of the propeller, and/or navigate the AAV away from the detected object.

20 Claims, 10 Drawing Sheets

Related U.S. Application Data

(60) Provisional application No. 62/036,071, filed on Aug. 11, 2014.

(51) Int. Cl.

| | | |
|---|---|---|
| *B64C 39/02* | (2023.01) | |
| *B64D 1/12* | (2006.01) | |
| *B64D 27/24* | (2006.01) | |
| *B64D 45/00* | (2006.01) | |
| *F16D 43/00* | (2006.01) | |
| *F16P 3/00* | (2006.01) | |
| *G08G 5/04* | (2006.01) | |
| *H02P 3/04* | (2006.01) | |
| *H02P 3/10* | (2006.01) | |
| *B64U 10/00* | (2023.01) | |
| *B64U 30/20* | (2023.01) | |
| *B64U 50/19* | (2023.01) | |
| *B64U 101/60* | (2023.01) | |

(52) U.S. Cl.
CPC .............. *B64D 1/12* (2013.01); *B64D 27/24* (2013.01); *B64D 45/00* (2013.01); *F16D 43/00* (2013.01); *F16P 3/00* (2013.01); *G08G 5/04* (2013.01); *H02P 3/04* (2013.01); *H02P 3/10* (2013.01); *B64U 10/00* (2023.01); *B64U 30/20* (2023.01); *B64U 50/19* (2023.01); *B64U 2101/60* (2023.01)

(58) Field of Classification Search
CPC ......... B64D 45/00; F01D 21/14; F01D 21/04; F01D 21/06; F01D 21/00; G08G 5/04; H02P 3/08; H02P 3/16; H02P 3/26; H02P 3/04; F16P 3/00; B64C 39/024; B64C 39/02; B64C 2201/042; B64C 2201/108; B64C 2201/128
See application file for complete search history.

(56) References Cited

U.S. PATENT DOCUMENTS

| | | | |
|---|---|---|---|
| 3,805,723 A | 4/1974 | Bernaerts | |
| 5,371,581 A | 12/1994 | Wangler et al. | |
| 5,847,522 A | 12/1998 | Barba | |
| 6,676,460 B1 | 1/2004 | Motsenbocker | |
| 6,804,607 B1 | 10/2004 | Wood | |
| 7,171,879 B2 | 2/2007 | Gass et al. | |
| 7,335,071 B1 | 2/2008 | Motsenbocker | |
| 7,946,526 B2* | 5/2011 | Zimet | A63H 27/12 244/17.23 |
| 8,473,189 B2* | 6/2013 | Christoph | G01S 17/931 244/17.11 |
| 8,639,400 B1* | 1/2014 | Wong | A63H 30/04 701/16 |
| 9,193,452 B2 | 11/2015 | Carreker | |
| 9,321,531 B1 | 4/2016 | Takayama et al. | |
| 9,677,564 B1 | 6/2017 | Woodworth et al. | |
| 2006/0287829 A1 | 12/2006 | Pashko-Paschenko | |
| 2007/0102565 A1 | 5/2007 | Speer et al. | |
| 2007/0210953 A1 | 9/2007 | Abraham et al. | |
| 2007/0246601 A1 | 10/2007 | Layton | |
| 2007/0262195 A1 | 11/2007 | Bulaga et al. | |
| 2008/0184906 A1* | 8/2008 | Kejha | B64C 39/024 102/374 |
| 2009/0027253 A1 | 1/2009 | Tooren et al. | |
| 2010/0100269 A1 | 4/2010 | Ekhaguere et al. | |
| 2010/0206145 A1 | 8/2010 | Tetelbaum et al. | |
| 2010/0299067 A1 | 11/2010 | McCollough et al. | |
| 2011/0178711 A1 | 7/2011 | Christoph | |
| 2011/0210866 A1 | 9/2011 | David et al. | |
| 2011/0227435 A1* | 9/2011 | Maeda | B60L 50/16 310/77 |
| 2011/0253831 A1* | 10/2011 | Cheng | A63H 27/12 244/17.11 |
| 2011/0301787 A1 | 12/2011 | Chaperon et al. | |
| 2012/0091260 A1 | 4/2012 | Callou | |
| 2012/0229325 A1 | 9/2012 | Dutruc | |
| 2012/0235606 A1 | 9/2012 | Takeuchi | |
| 2013/0206915 A1 | 8/2013 | Desaulniers | |
| 2013/0320133 A1 | 12/2013 | Ratti et al. | |
| 2013/0332062 A1* | 12/2013 | Kreitmair-Steck | G01S 7/062 701/301 |
| 2014/0010656 A1 | 1/2014 | Nies | |
| 2014/0271200 A1* | 9/2014 | Sutton | B64C 27/33 29/889 |
| 2015/0098819 A1 | 4/2015 | Tourin et al. | |
| 2015/0191255 A1 | 7/2015 | Zolich et al. | |
| 2015/0286216 A1 | 10/2015 | Miwa | |
| 2015/0314881 A1* | 11/2015 | Tsaliah | B64D 17/80 244/146 |
| 2016/0001877 A1* | 1/2016 | Paulos | B64C 27/57 701/3 |
| 2016/0085238 A1* | 3/2016 | Hayes | B64C 39/024 701/4 |
| 2016/0125746 A1 | 5/2016 | Kunzi et al. | |

FOREIGN PATENT DOCUMENTS

| | | |
|---|---|---|
| CN | 203039518 U | 7/2013 |
| CN | 104760704 A | 7/2015 |
| EP | 3415436 A1 | 12/2018 |
| GB | 2455374 A | 6/2009 |
| GB | 2455374 B | 11/2009 |
| JP | S48088255 U | 10/1973 |
| JP | S56048952 | 11/1981 |
| JP | H0712088 A | 1/1995 |
| JP | 2009297449 A | 12/2009 |
| JP | 2010095246 A | 4/2010 |
| JP | 2012037204 A | 2/2012 |
| WO | 2007052246 A1 | 5/2007 |
| WO | 2008147484 A2 | 12/2008 |
| WO | 2008147484 A3 | 2/2009 |
| WO | 2009153588 A1 | 12/2009 |
| WO | 2010070717 A1 | 6/2010 |
| WO | 2012012752 A2 | 1/2012 |
| WO | 2012012752 A9 | 6/2012 |
| WO | 2013140085 A1 | 9/2013 |
| WO | 2014064431 A2 | 5/2014 |
| WO | 2014068982 A1 | 5/2014 |
| WO | 2014080409 A1 | 5/2014 |
| WO | 2014064431 A3 | 7/2014 |

OTHER PUBLICATIONS

International Search Report for PCT Application No. PCT/US2015/044377 dated Oct. 19, 2015.
Ivan Barajas, "Parrot Unveils New Drone and Controller," May 14, 2014; https://blog.newegg.com/parrot-unveils-drone-controller-oculus-compatible/, accessed Dec. 21, 2016.
MicroPilot home page, https://www.micropilot.com/; archived on Jan. 3, 2013 by Internet Archive, http://web.archive.org/web/2013103180733/http://www.micropilot.com/?, accessed May 2, 2016.
Norman Chan, "Hands-On with Parrot's Bebop Drone Quadcopter", tested.com, May 12, 2014; http://www.tested.com/tech/robots/461148-parrots-bebop-drone-what-you-should-know/, accessed Dec. 22, 2016.
rchelicopterfun.com, "Parrot AF Drone Quadcopter Review", http://www.rchelicopterfun.com/parrot-ar-drone.html; archived on Mar. 27, 2012 by Internet Archive, http://web.archive.org/web/20120327140509/http://www.rchelicopterfun.com/parrot-ar-drone.html, accessed Apr. 27, 2016.
Search Report for Chinese Patent Application No. 201580043049.8, dated Nov. 30, 2018.
Wikipedia, "Apollo Abort Modes", https://en.wikipedia.org/wiki/Apollo_abort_modes; archived by Internet Archive on Aug. 16, 2012, https://web.archive.org/web/20120816115115/https://en.wikipedia.org/wiki/Apollo_abort_modes; accessed Jul. 9, 2019 (Year: 2012).

(56) References Cited

OTHER PUBLICATIONS

Wikipedia, "Space Shuttle Abort Modes," https://en.wikipedia.org/wiki/Space_Shuttle_abort_modes; archived by Internet Archive on Aug. 15, 2012, https://web.archive.org/web/20120815031221/https://en.wikipedia.org/wiki/Space_Shuttle_abort_modes; accessed Jul. 9, 2019 (Year: 2012).

* cited by examiner

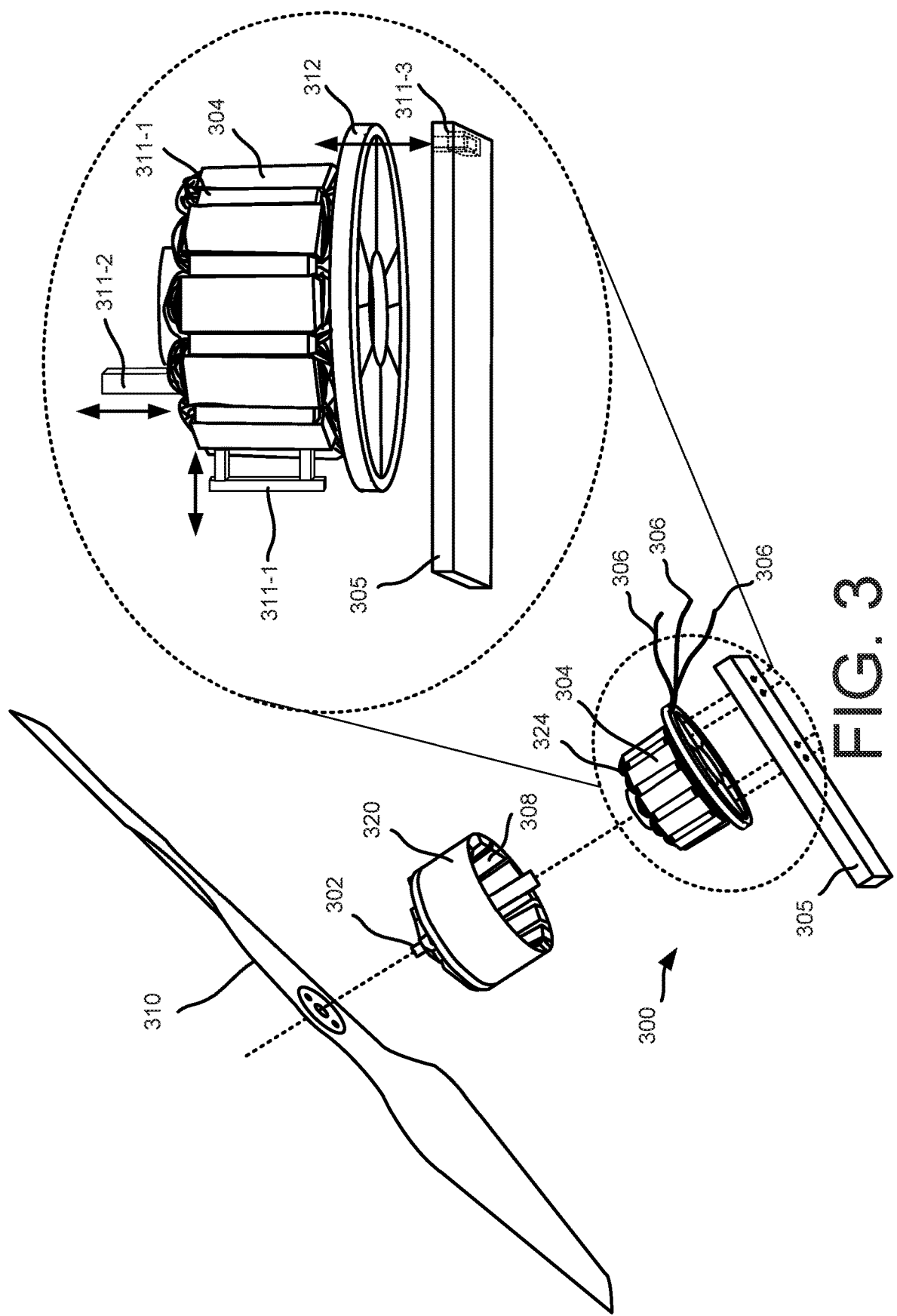

PROPELLER SAFETY FOR AUTOMATED AERIAL VEHICLES

CROSS-REFERENCE TO RELATED APPLICATIONS

This application is a continuation of and claims priority to U.S. application Ser. No. 14/491,215, filed Sep. 19, 2014, which claims priority to U.S. Application No. 62/036,071, filed Aug. 11, 2014, each of which is incorporated herein by reference in its entirety.

BACKGROUND

Automated aerial vehicles are increasing in use. For example, unmanned aerial vehicles are often used for surveillance and multi-propeller automated aerial vehicles are utilized by many hobbyists, often flying them at public parks, or other areas populated by humans, pets and other animals. The propellers, which rotate at a very high speed, are dangerous and potentially harmful if contact is made with the propeller by a human, pet, or other animal occurs while the propeller is rotating.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a diagram of a motor and a propeller, according to an implementation.

Figure 1:
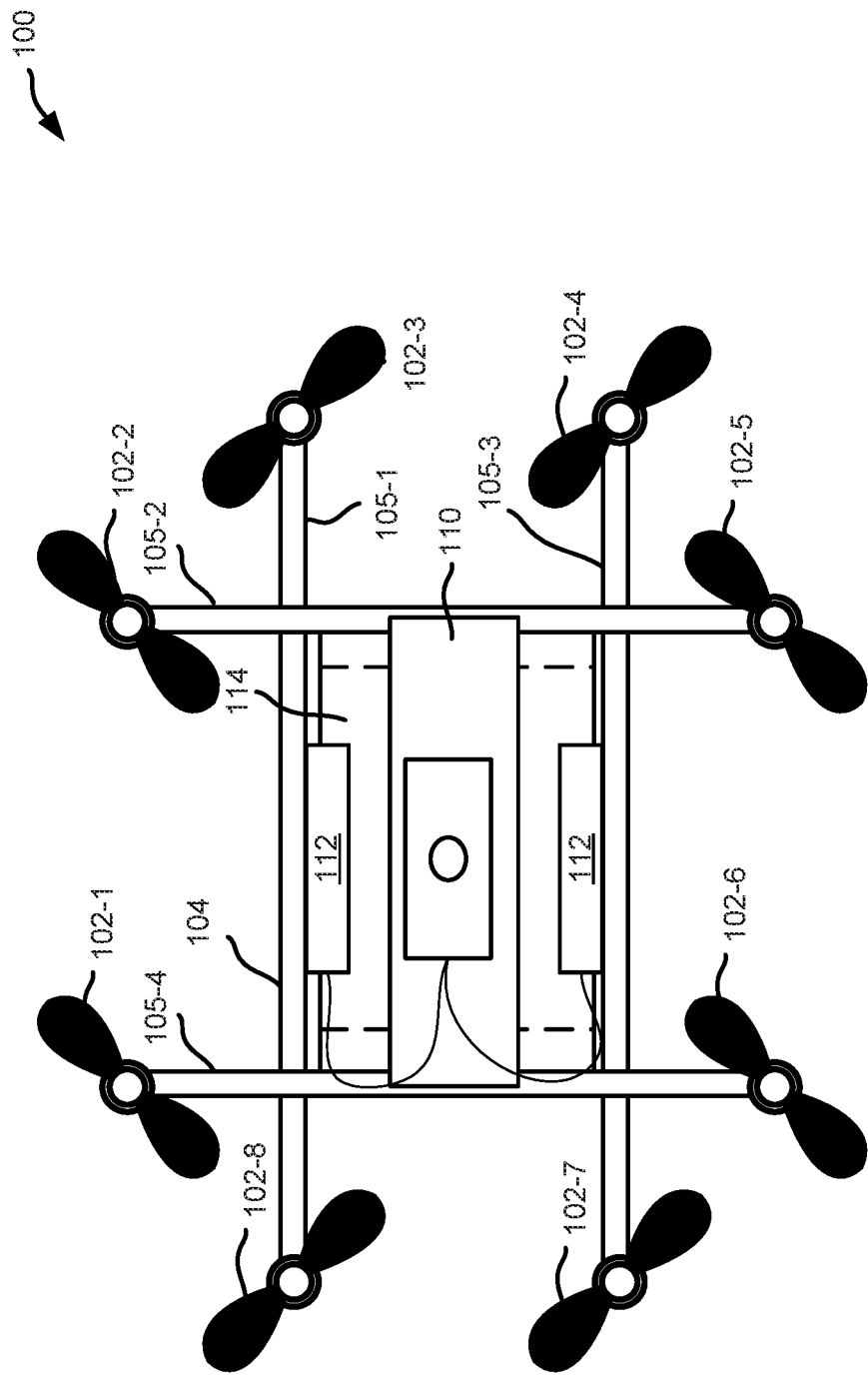
FIG. 1 depicts a block diagram of a top-down view of an automated aerial vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an automated aerial vehicle ("AAV") and system for automatically detecting a contact or an imminent contact between a propeller of the AAV and an object (e.g., human, pet, or other animal). Contact may be detected based on a change in an electrical current through the propeller resulting from the contact, based on a change in external force applied to the propeller, based on a contact detected by a pressure sensitive material on the propeller, a change in an expected position of the propeller, a change in propeller vibration, a change in an audible characteristic of the propeller, etc. Upon detecting a contact between the propeller and an object, a safety profile is automatically performed to reduce any harm to the object and/or the AAV by quickly stopping the propeller. For example, the propeller may be stopped by removing the current to the motor that rotates the propeller, reversing the polarity of the current to the motor that rotates the propeller, deploying a stop bar that contacts the rotor of the motor to stop the rotation of the motor and the propeller, transitioning weights to the perimeter of the propeller to stop the rotation of the propeller, disengaging from the motor the shaft that rotates the propeller, releasing the clamps that secure the propeller to the motor, reorienting the propeller blades, etc.

In other implementations, a sensor may be used to detect an imminent contact with the propeller by an object. For example, a rangefinder mounted to the AAV may detect an object entering a safety perimeter (discussed below) of the propeller. When the object is detected, a safety profile is automatically performed to either avoid or prevent the contact from occurring. For example, the propeller may be stopped and/or the AAV may maneuver away from the detected object. In some implementations, one or more additional propellers of the AAV may also be stopped to further reduce the likelihood of a harmful contact between a propeller of the AAV and the object.

By eliminating or reducing harmful contacts between a propeller of an AAV and an object, AAVs may be operated in areas with unknown or changing surroundings without injuring the AAV or objects (e.g., humans, pets, or other animals). For example, an AAV may be configured to deliver a payload that contains an item ordered from an e-commerce website to a customer specified location (e.g., a backyard of customer's home). As the AAV is preparing to land at the customer specified location to deliver the payload, it may monitor for objects (e.g., pets, humans) approaching the AAV and quickly respond to prevent the object from becoming harmed. For example, if a dog (object) approaches the AAV as the AAV is landing and the dog enters the safety perimeter of one of the propellers of the AAV, a safety profile is automatically performed so that the dog is not harmed by the propeller. As discussed below, the safety profile may include stopping the propeller, stopping other propellers of the AAV, maneuvering the AAV away from the object, landing the AAV, emitting an audible tone, altering an orientation of the blades of the propeller, etc.

In some implementations, the AAV will communicate with other AAVs in the area to provide and/or receive information, such as AAV identification, current position, altitude, velocity, etc. For example, AAVs may be configured to support automatic dependent surveillance-broadcast (ADS-B) and both receive and/or transmit identification, current position, altitude, and velocity information. This information may be stored in a central location and/or dynamically shared between nearby AAVs, materials handling facilities, relay locations, the AAV control system and/or other locations. For example, other AAVs may provide ADS-B information and/or additional information regarding weather (e.g., wind, snow, rain), landing conditions, traffic, objects, safety profiles used in different areas, safety profiles performed, etc. Receiving AAVs may utilize this information to plan the route/flight path from a source location to a destination location, to select a safety profile for use in monitoring for objects, to modify the actual navigation of a route, etc.

While the examples discussed herein primarily focus on AAVs in the form of an aerial vehicle utilizing multiple propellers to achieve flight (e.g., a quad-copter or octo-copter), it will be appreciated that the implementations discussed herein may be used with other forms and configurations of AAVs.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more items may be delivered. For example, the delivery location may be a residence, a place of business, a location within a materials handling facility (e.g., packing station, inventory storage), any location where a user or inventory is located, etc. Inventory or items may be any physical goods that can be transported using an AAV.

A "relay location," as used herein, may include, but is not limited to, a delivery location, a materials handling facility, a cellular tower, a rooftop of a building, a delivery location, or any other location where an AAV can land, charge, retrieve inventory, replace batteries, and/or receive service.

FIG. 1 illustrates a block diagram of a top-down view of an AAV 100, according to an implementation. As illustrated, the AAV 100 includes eight propellers 102-1, 102-2, 102-3, 102-4, 102-5, 102-6, 102-7, 102-8 spaced about the frame 104 of the AAV. The propellers 102 may be any form of propeller (e.g., graphite, carbon fiber) and of a size sufficient to lift the AAV 100 and any inventory engaged by the AAV 100 so that the AAV 100 can navigate through the air, for example, to deliver an item to a delivery location. While this example includes eight propellers, in other implementations, more or fewer propellers may be utilized. Likewise, in some implementations, the propellers may be positioned at different locations on the AAV 100. In addition, alternative methods of propulsion may be utilized. For example, fans, jets, turbojets, turbo fans, jet engines, and the like may be used to propel the AAV.

The frame 104 or body of the AAV 100 may likewise be of any suitable material, such as graphite, carbon fiber and/or aluminum. In this example, the frame 104 of the AAV 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length, while in other implementations some or all of the rigid members may be of different lengths. Likewise, the spacing between the two sets of rigid members may be approximately the same or different.

While the implementation illustrated in FIG. 1 includes four rigid members 105 that are joined to form the frame 104, in other implementations, there may be fewer or more components to the frame 104. For example, rather than four rigid members, in other implementations, the frame 104 of the AAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. A cavity within the frame 104 may be configured to include an inventory engagement mechanism for the engagement, transport and delivery of item(s) and/or containers that contain item(s).

In some implementations, the AAV may be configured for aerodynamics. For example, an aerodynamic housing may be included on the AAV that encloses the AAV control system 110, one or more of the rigid members 105, the frame 104 and/or other components of the AAV 100. The housing may be made of any suitable material(s), such as graphite, carbon fiber, aluminum, etc. Likewise, in some implementations, the location and/or the shape of the inventory (e.g., item or container) may be aerodynamically designed. For example, in some implementations, the inventory engagement mechanism may be configured such that, when the inventory is engaged, it is enclosed within the frame and/or housing of the AAV 100 so that no additional drag is created during transport of the inventory by the AAV 100. In other implementations, the inventory may be shaped to reduce drag and provide a more aerodynamic design of the AAV and the inventory. For example, if the inventory is a container and a portion of the container extends below the AAV when engaged, the exposed portion of the container may have a curved shape.

The propellers 102 and corresponding propeller motors are positioned at both ends of each rigid member 105. The rigid members 105 to which a propeller motor is mounted is also referred to herein as a motor arm. The propeller motors may be any form of motor capable of generating enough speed with the propellers to lift the AAV 100 and any engaged inventory, thereby enabling aerial transport of the inventory. For example, the propeller motors may each be a FX-4006-13 740 kv multi rotor motor. Example implementations of motor configurations that may be used with various implementations are described in further detail below with respect to FIGS. 2-4. The propellers may be of any size and material sufficient to lift the AAV 100 and any engaged payload. In some implementations, the propellers may be formed of a conductive material, such as carbon fiber, aluminum, graphite, silver, copper, steel, etc. In some implementations, the propellers may include a pressure sensitive material that can detect a touch of an object with the propeller. In other implementations, the propellers may be configured such that the blades of the propellers may re-orient as part of a safety profile. For example, when a contact or an imminent contact is detected, the blades of the propellers may be re-oriented approximately ninety degrees so that the leading edge of the propeller is a flat portion of the propeller blade. In still another example, the propellers may include deployable weights. The deployable weights may typically be maintained at or near a center of the propeller. However, if a safety profile is executed, the weights may be released, moving them to the outer perimeter of the propeller, thereby slowing or stopping the rotation of the propeller. In yet another implementation, the blades of the propellers may be hinged near a center point of the propeller so that they deflect when contact with an object occurs.

Mounted to the frame 104 is the AAV control system 110. In this example, the AAV control system 110 is mounted in the middle and on top of the frame 104. The AAV control system 110, as discussed in further detail below with respect to FIG. 9, controls the operation, routing, navigation, communication, safety profile selection and implementation, and the inventory engagement mechanism of the AAV 100.

Likewise, the AAV 100 includes one or more power modules 112. In this example, the AAV 100 includes two power modules 112 that are removably mounted to the frame 104. The power module for the AAV may be in the form of battery power, solar power, gas power, super capacitor, fuel cell, alternative power generation source, or a combination thereof. For example, the power modules 112 may each be a 6000 mAh lithium-ion polymer battery, polymer lithium ion (Li-poly, Li-Pol, LiPo, LIP, PLI or Lip) battery. The power module(s) 112 are coupled to and provide power for the AAV control system 110 and the propeller motors.

In some implementations, one or more of the power modules may be configured such that it can be autonomously removed and/or replaced with another power module while the AAV is landed. For example, when the AAV lands at a delivery location, relay location and/or materials handling facility, the AAV may engage with a charging member at the location that will recharge and/or replace the power module.

As mentioned above, the AAV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. The inventory engagement mechanism may be positioned beneath the AAV control system 110. In implementations with additional rigid members, the AAV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the AAV control system 110.

While the implementations of the AAV discussed herein utilize propellers to achieve and maintain flight, in other implementations, the AAV may be configured in other manners. For example, the AAV may include fixed wings and/or a combination of both propellers and fixed wings. For example, the AAV may utilize one or more propellers to enable takeoff and landing, and a fixed wing configuration or a combination wing and propeller configuration to sustain flight while the AAV is airborne.

Figure 2:
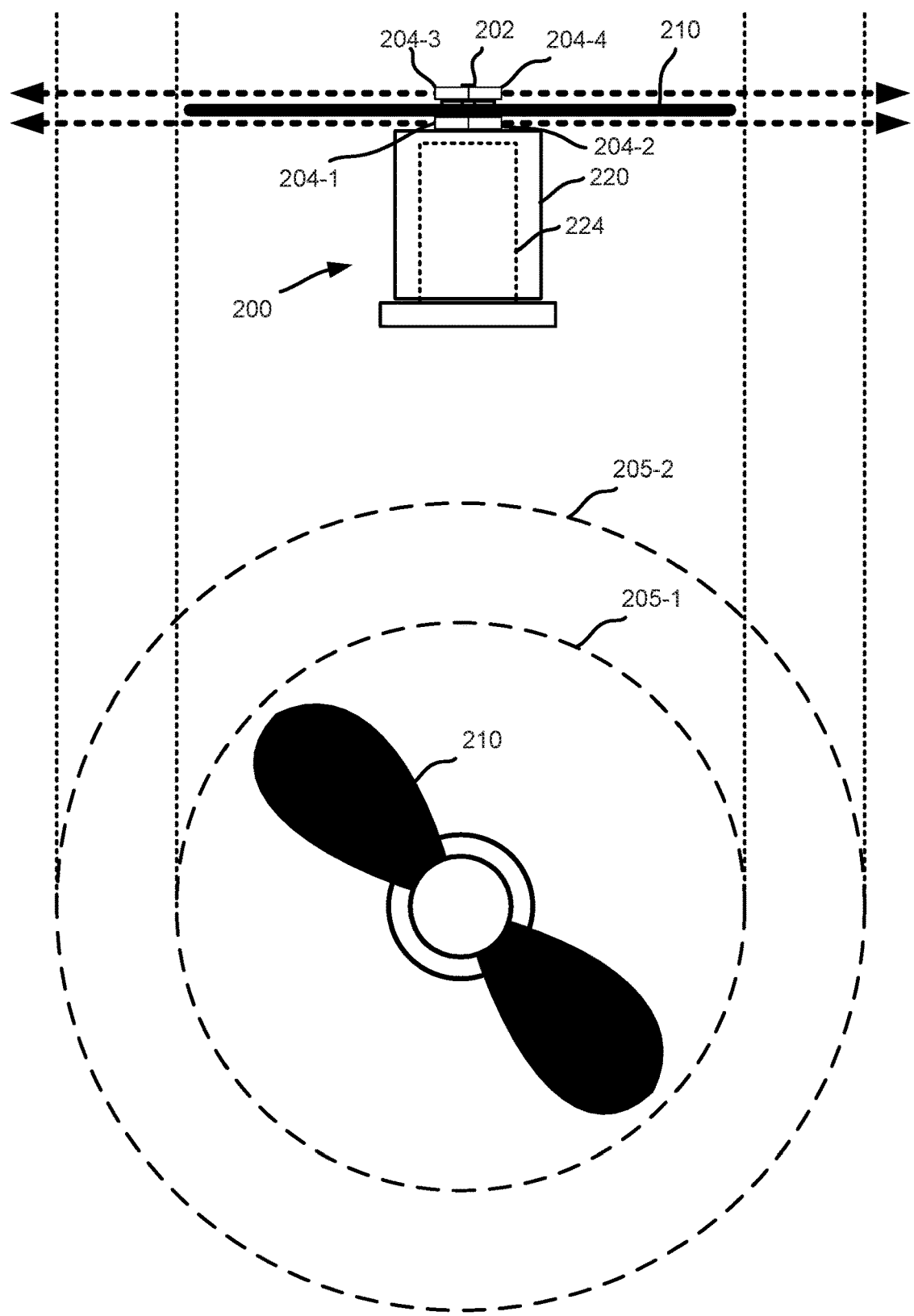
FIG. 2 depicts a top-down and side view of a motor and a propeller of an automated aerial vehicle, according to an implementation.

FIG. 2 depicts a top-down and side view of a motor 200 and a propeller 210 of an AAV 100 (FIG. 1), according to an implementation. In the discussed examples, the motor 200 is an outrunner brushless motor. In other implementations, the motor may be a different type of motor, such as an inrunner brushless motor, a brushed motor, etc.

The motor 200 includes a rotor 220 (outer portion) which rotates around a stator 224 (or inner portion). Mounted to the rotor 220 is a rotating shaft 202 that rotates with the rotor 220. The propeller 210 is coupled to the rotating shaft 202 and rotates with the rotating shaft 202.

A rotor 220 typically has four or more magnetic poles. The stator 224, also known as an armature, includes an electromagnetic assembly that is charged or controlled by an electronic speed control that provides current to the electromagnets. As the current is applied to the stator 224, the differing polarities between the charged electromagnets and the fixed magnetic poles of the rotor 220 cause the rotor 220 to rotate, which in turn causes the rotating shaft 202 and the propeller 210 to rotate.

One or more object detection components 204 may be coupled to the rotor 220 and/or the rotating shaft 202 such that the object detection components 204 rotate as the rotor 220 rotates. In this example, two object detection components 204-1, 204-2 are coupled to the rotating shaft 202 and the top of the rotor 220 and positioned beneath the propeller 210 to detect any objects approaching the propeller 210 from below the propeller 210. In this example, the two object detection components 204-1, 204-2 are oriented in opposite directions. By incorporating pairs of object detection components in opposite directions, rotational balance of the rotor is maintained. If there is a protective housing around the motor 200, the object detection components may be positioned above and outside the housing, or one or more openings may be included in the housing so that the object detection components may transmit signals through the openings to detect objects.

Two object detection components 204-3, 204-4 may also be coupled to the rotating shaft 202 above the propeller 210 to detect any objects approaching the propeller 210 from above. As illustrated, the pair of object detection components 204-3, 204-4 are also oriented in opposite directions. In some implementations, the two pairs of object detection components, the lower pair of object detection components 204-1, 204-2 and the upper pair of object detection components 204-3, 204-4, may be oriented at approximately ninety degrees with respect to each other. In other implementations, they may be oriented in the same direction, or any other angle with respect to each other.

While the object detection components 204-1, 204-2 detect objects approaching from below and object detection components 204-3, 204-4 detect objects approaching from above, all four object detection components 204 may be utilized to detect objects approaching from the perimeter or side of the propeller 210. The vertical separation between object detection components 204-1, 204-2 and object detection components 204-3, 204-4 may be small enough to detect objects approaching from the perimeter or side of the propeller 210. For example, the vertical separation may be between approximately five and approximately ten centimeters.

The object detection components 204 may be any form of device that can be used to detect a presence of an object. For example, the object detection components 204 may be any one of an ultrasonic ranging module, a laser rangefinder, a radar distance measurement module, stadiametric based rangefinder, a parallax based rangefinder, a coincidence based rangefinder, a Lidar based rangefinder, Sonar based rangefinder, or a time-of-flight based rangefinder. In some implementations, different object detection components may be utilized on the AAV. For example, the object detection component 204-1 may be a laser rangefinder and the object detection component 204-2 may be a radar distance measuring module. Likewise, in some implementations, the object detection component 204 may also be configured to determine a distance between a detected object and the object detection component.

By mounting the object detection components 204 to the rotor and/or the rotating shaft, the object detection components 204 rotate as the motor and propeller turn. As the object detection components rotate, they emit signals configured to detect a presence of an object and, when an object is detected, determine a distance between the object and the AAV. By rotating the object detection component with the rotation of the motor, a 360 degree perimeter around the propeller can be monitored with the object detection components.

For example, the object detection component may be a laser based rangefinder that emits a laser (signal) as it rotates with the rotation of the propeller. When the emitted laser contacts an object, the laser is reflected back to and received by the object detection component 204. Based on the time of the emission and the receipt of the reflected laser, the distance between the object and the object detection component, and thus the AAV, can be determined.

While the above example illustrates coupling the object detection component(s) to the rotor and/or the rotating shaft, it will be appreciated that in other implementations, the object detection component(s) may be mounted to other locations of the AAV. For example, one or more object detection components may be mounted to the body of the AAV and oriented to emit signals to detect the presence of an object before it contacts the AAV. In such an implementation, the object detection component(s) may be coupled to the AAV in a fixed or rotating configuration.

In some implementations, the motor may communicate with or include Electronic Speed Control (ESC) circuitry that keeps track of the position of the rotor 220 so it can control the electromagnetics of the stator. The position of the rotor 220 may be determined using, for example, magnetic sensors (based on the Hall-effect) or using what is known as "sensorless" techniques. Generally, using sensorless techniques, the position of the rotor is determined by monitoring the motor power wires (not shown) for fluctuations caused by the spinning magnets of the rotor. Other techniques may also be utilized for determining the position of the rotor. For example, a marker or other identifier may be included on the rotor 220, rotating shaft 202 and/or the propeller 210 at a determined position. A sensor may be used to detect the position of the marker and, each time the marker passes the sensor, the position of the rotor 220 and thus the object detection component(s) are known. In some implementations, the position of the rotor 220 may not be determined and/or may only be determined periodically. For example, the position of the rotor 220 may not be monitored unless an object is detected. When an object is detected, the position of the rotor 220 may be determined to determine the position of the AAV with respect to the object.

By mounting the object detection components at known positions on the rotor 220 and/or rotating shaft 202 and monitoring the position of the rotor 220, the direction of the signal emitted from the object detection component, with respect to the position of the AAV 100, is known. When an object is detected, the distance to the object is determined, and based on the position of the object detection component, the direction of the object with respect to the AAV is also determined.

In some implementations, a safety profile module 913 (FIG. 9) may communicate with the object detection components 204 to monitor for objects entering an established safety perimeter 205 surrounding one or more of the propellers 210 of the AAV. A safety perimeter 205 may be any defined distance surrounding a propeller 210. Depending on a selected safety profile (discussed below), the size of the safety perimeter 205 around the propeller 210 may vary. For example, when an expanded perimeter safety profile is selected, an expanded safety perimeter 205-2 may be monitored to detect for objects entering the expanded safety perimeter 205-2. An expanded safety profile may be used when the AAV 100 is located in areas where an encounter with an object is more likely and/or where additional safety is desired. For example, when the AAV is landing, taking off, flying at a low altitude, near buildings, etc., an expanded safety profile may be selected and a corresponding expanded safety perimeter 205-2 monitored for objects entering the expanded safety perimeter 205-2. If an object is detected within the expanded safety perimeter 205-2, the expanded safety profile is automatically performed, as discussed further below.

In a similar manner, when a contracted perimeter safety profile is selected, the contracted safety perimeter 205-1 may be monitored for objects entering the contracted safety perimeter 205-1. The contracted safety profile may be used when the AAV 100 is located in areas where an encounter with an object is unlikely. For example, when the AAV is in-route, traveling at a high altitude, in a controlled area (e.g., materials handling facility), etc., a contracted safety profile may be selected and a corresponding contracted safety perimeter 205-1 monitored for objects entering the contracted safety perimeter 205-1. If an object is detected within the contracted safety perimeter 205-1, the contracted safety profile may be automatically performed, as discussed further below.

The safety perimeters, such as contracted safety perimeter 205-1 or the expanded safety perimeter 205-2, may be any defined distance or perimeter around a propeller. For example, the contracted safety perimeter 205-1 may be a perimeter that extends approximately five centimeters from the ends of the propeller 210. In comparison, the expanded safety perimeter 205-2 may be a perimeter that extends approximately ten centimeters from the ends of the propeller 210. In other implementations, the perimeters may be different distances from the ends of the propeller 210.

In some implementations, there may be no safety perimeter and/or no object detection components 204. For example, rather than monitoring for an object entering a safety perimeter 205, the propellers 210 may be monitored for a contact. For example, the propellers 210 may be formed of an electrically conductive material (e.g., carbon fiber, graphite, aluminum) and a current through the propeller and/or capacitance of the propeller may be monitored for a change resulting from a contact. In still another implementation, the propellers may include a pressure sensitive material that is monitored for a contact with an object. In other implementations, the electronic speed controls (ESCs) may be monitored for a change in an external force applied to the propeller, resulting from a contact with the propeller by an object. In still another example, the position of the propeller may be monitored and if the expected position of the propeller does not correspond with the actual position, it may be determined that a contact with an object by the propeller has occurred. In response to a change in a current and/or capacitance of the propeller, a contact detected by a pressure sensitive material of the propeller, a change in an external force applied to the propeller and/or a change in an expected position of the propeller, a safety profile is automatically performed, as discussed further below.

In some implementations, both a contact with the propeller and a safety perimeter may be monitored. If either detect an object, a safety profile may be automatically performed, to reduce or avoid any contact with the object. Likewise, in some implementations, the contracted safety profile may include monitoring for a contact with the propeller by an object, and the expanded safety profile may include monitoring a perimeter surrounding the propeller.

In some implementations, such as when the AAV is located within a controlled area, for example a materials handling facility, monitoring for objects may be done by components that are external to the AAV. For example, an AAV control system of the materials handling facility may communicate with and/or control the AAV and one or more cameras within the materials handling facility may monitor the area surrounding the AAV for objects. If an object is detected, the AAV control system may cause the AAV to avoid the object by navigating the AAV away from the object. In other implementations, if the object enters a safety perimeter of one of the AAV propellers, the AAV control system may cause a safety profile to be performed by the AAV.

FIG. 3 is a diagram of a motor 300 and a propeller 310, according to an implementation. As discussed above, the motor 300 may be mounted to an end of a motor arm 305. The example illustrated in FIG. 3 depicts components of an outrunner brushless motor. The motor 300 includes a stator 324, a rotor 320 and a rotating shaft 302. The propeller 310 mounts to the rotating shaft 302. The motor 300 communicates with the ESC 904 (FIG. 9) circuitry via wires 306. The ESC 904 may be included in the AAV control system and the wires 306 may extend from the motor 300, through the motor arm 305 to the ESC 904. In other implementations, the communication between the motor 300 and the ESC may be done wirelessly.

The motor 300 and attached propeller 310 are rotated in response to the ESC 904 providing a current to the motor 300 that charges the electromagnets 304. The charged electromagnets 304 of the stator 324 cause the rotor 320 to rotate. In typical operation, the ESC 904 charges the electromagnets by sending a current to the motors over the three different wires 306 in the form of different square waves. The speed of the motor is controlled by increasing or decreasing the length of the square waves sent over the three wires 306. To stop the motor 300, the current may be removed from the motor 300, thereby removing the charge from the electromagnets 304 and causing the motor 300 to stop. In another implementation, the sequence of current and/or the polarity of the square waves may be altered or reversed causing the electromagnets 304 of the stator 324 to stop the rotor 320 and thus the propeller 310. Because the electromagnets 304 of the stator 324 respond very quickly to current changes, the motor 300 can be stopped in only a few degrees of rotation by reversing the polarity of the current or by removing the current from the motor 300.

As an alternative, or in addition to, removing or reversing the current to the motor 300, in some implementations, the motor may include one or more stop bars 311 that may be deployed by the safety profile module 913 (FIG. 9) from a retracted position to an extended position to stop the rotation of the rotor 320 of the motor 300 and, thus, stop the rotation of the propeller 310. During normal operation, the stop bar(s) 311 are maintained in a retracted position between the electromagnets 304 or within the stator 324. When deployed, the stop bar(s) 311-1 move from the retracted position to an extended position that causes the stop bar(s) 311-1 to engage the rotor 320 of the motor 300.

For example, as illustrated in the expanded view of the stator 324, the stator 324 may include one or more stop bars 311-1 positioned between the poles of the electromagnets 304 that are deployable into the rotor 320. In some implementations, the stop bars 311-1 may be narrower than the gaps between the fixed magnets 308 mounted to the interior of the rotor 320. When the stop bar(s) 311-1 are deployed into the extended position, the stop bar(s) 311-1 lodge between the fixed magnets 308, thereby forcing the rotor 320 to stop rotating. Alternatively, the stop bar(s) 311-1 may be wider than the gap between the fixed magnets 308 of the rotor and may be configured to deploy into the interior of the rotor 320 stopping the rotor using friction. For example, the stop bar(s) 311-1 may have a rubber or other similar facing that, when deployed into the interior of the rotor 320, will cause the rotor to stop rotating, without damaging the rotor.

In some implementations, one or more stop bar(s) 311-2 may be positioned in the interior of the stator 324 and configured to deploy vertically from a retracted position to an extended position. When extended vertically, the stop bar(s) 311-2 will extend into an opening between two support arms (not shown) on the top of the rotor 320 that secure the rotating shaft 302 to the rotor 320. When a support arm contacts the extended stop bar(s) 311-2, it will force the rotor 320, and thus the propeller 310, to stop rotating.

In still another example, one or more stop bar(s) 311-3 may be included in the motor arm 305 and configured to extend from a retracted position to an extended position. The stop bar(s) 311-3 may be narrower than the gap between the fixed magnets 308 of the rotor such that, when deployed into an extended position, it will fit between two fixed magnets 308 of the rotor 320. When the stop bar(s) 311-3 is in a retracted position, the rotor 320 of the motor is able to rotate. When the stop bar(s) 311-3 is deployed into the extended position, the stop bar(s) 311-3 moves vertically from the motor arm 305 through an opening in the base 312 of the stator 324 and positions itself between a pair of the fixed magnets 308 of the rotor 320, thereby forcing the rotor 320 to stop rotating and, thus, stopping the rotation of the propeller 310.

Figure 4A:
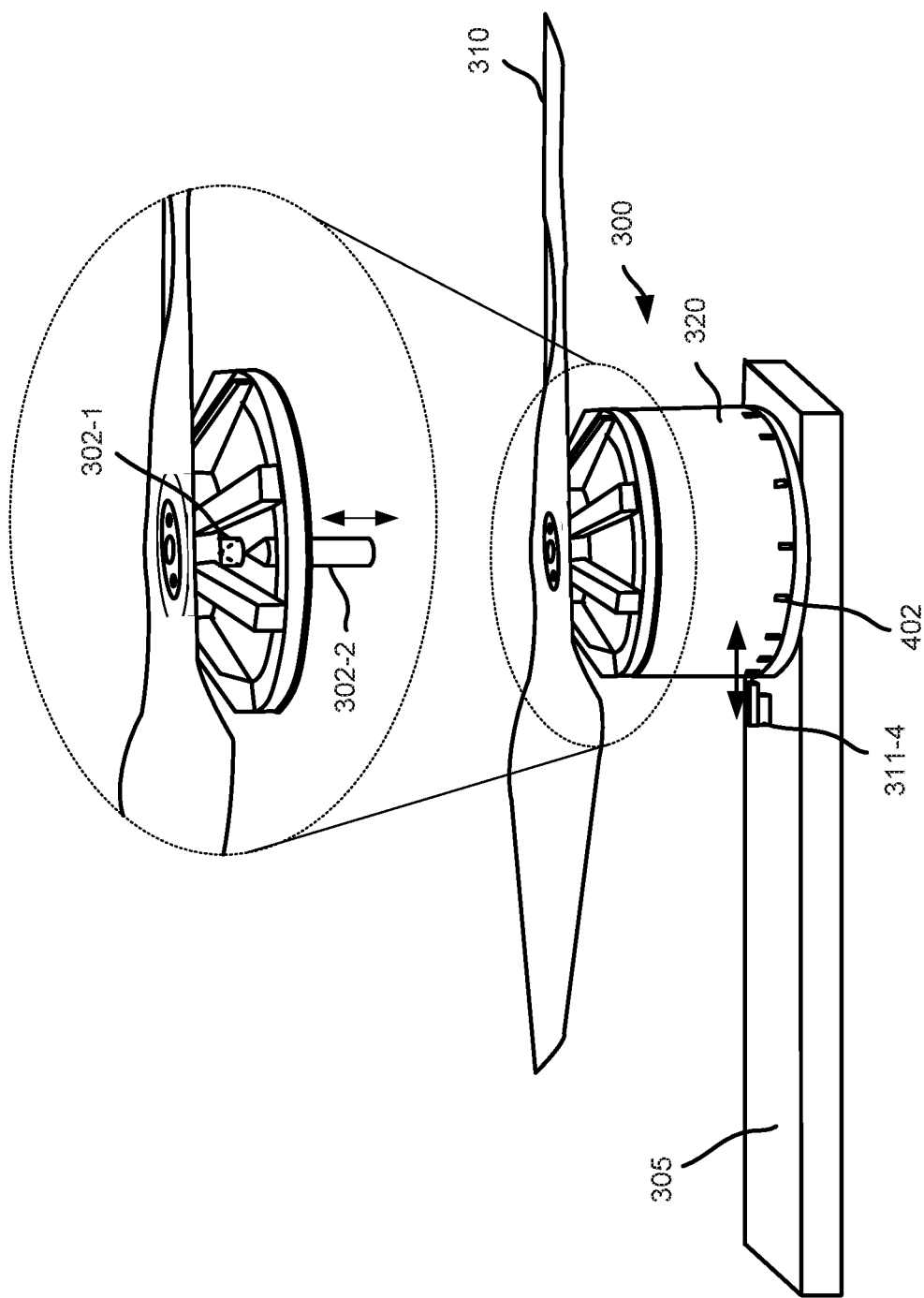
FIG. 4A is a diagram of another motor and a propeller, according to an implementation.

FIG. 4A is a diagram of another motor 300 and a propeller 310, according to an implementation to stop the rotation of the motor 300. The example configuration of FIG. 4A illustrates a stop bar 311-4 that may be mounted to the motor arm 305 and deployed from a retracted position to an extended position. When the stop bar 311-4 is in the retracted position, the motor 300 is able to operate normally. When the stop bar 311-4 is deployed, it engages the rotor 320 of the motor 300 and causes the rotor 320 to stop rotating. For example, the rotor 320 may include one or more openings 402 that are aligned with the stop bar 311-4 such that, when the stop bar 311-4 is deployed, it will extend into one of the openings 402, thereby forcing the rotor 320 to stop rotating.

In some implementations, as another alternative, the rotating shaft 302 may be disengaged from the propeller 310, as illustrated in the expanded view of FIG. 4A. For example, the rotating shaft may include a first portion 302-1 that is coupled to the propeller 310 and mates with, and is rotated by a second portion 302-2 of the rotating shaft 302 that is coupled to the rotor 320 of the motor. During normal operation, the first portion 302-1 and the second portion 302-2 are mated so that the motor can rotate the propeller 310. When a signal is received from the safety profile module 913, the second portion 302-2 may retract and disengage from the first portion 302-1. Because the propellers 310 have little weight, when they are not rotated by the rotating shaft, they will cause little or no damage/harm when they come into contact with an object. In another example, one or more pins, clamps or connectors that secure the propeller to the motor may be released or disengaged so that the propeller will not continue rotating with the motor.

Similar to the stop bar(s) 311, the second portion 302-2 of the rotating shaft may operate as a clutch. When a current or signal is applied, the second portion 302-2 is positioned into and mated with the first portion 302-1 of the rotating shaft 302. When a current or signal is removed, the second portion 302-2 retracts and decouples from the first portion 302-1 of the rotating shaft 302. In another implementation, the second portion 302-2 may be positioned into and mated with the first portion 302-1 when there is no current or signal. When a current or signal is applied, the two portions 302-1, 302-2 may decouple.

Figure 4B:
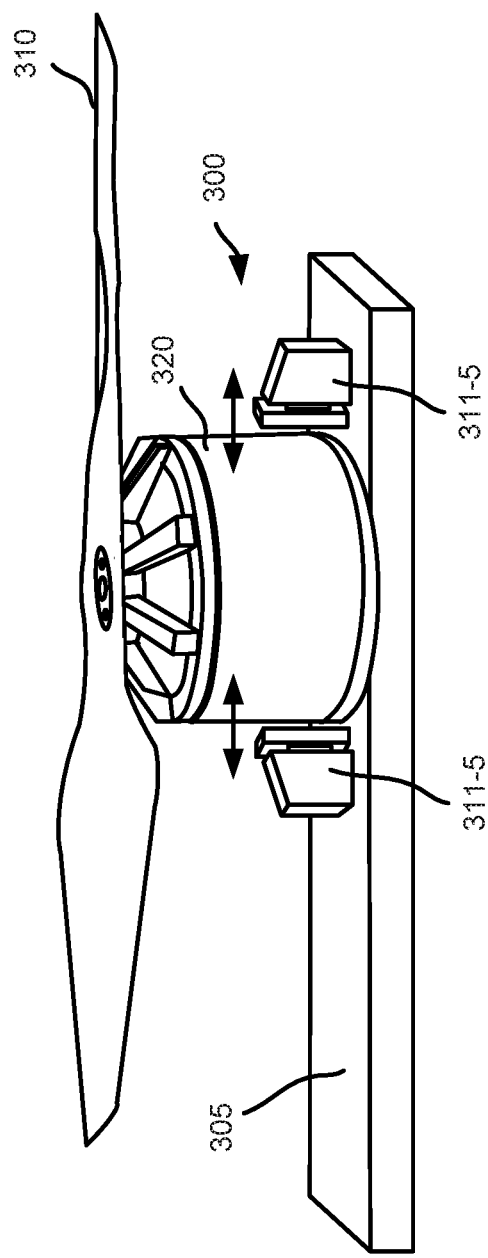
FIG. 4B is a diagram of another motor and a propeller, according to an implementation.

FIG. 4B is a diagram of another motor 300 and a propeller 310, according to an implementation to stop the rotation of the motor 300. The example configuration of FIG. 4B illustrates a stop bar(s) 311-5 that may be mounted to the motor arm 305 and deployed from a retracted position to an extended position. The stop bar(s) 311-5 may be configured with a surface area larger than the surface area of stop bar 311-4 and configured to stop the rotation of the rotor 320 using friction. For example, the stop bar(s) 311-5 may have a rubber or other similar facing surface material that, when deployed, contacts the exterior of the rotor 320 and causes the rotor 320 to stop rotating. When the stop bar(s) 311-5 is in the retracted position, the motor 300 is able to operate normally. When the stop bar 311-5 is deployed, it engages the exterior of the rotor 320 and causes the rotor 320 to stop rotating.

In some implementations, the stop bar(s) 311 may be configured as a magnetic clutch such that, when the electromagnets are charged, the stop bar(s) 311 is maintained in a retracted position and the charge of the electromagnets maintains the stop bar(s) in a retracted position. When the electromagnets are not charged, the stop bar(s) 311 may automatically deploy. In another implementation, the charge may be provided directly to the stop bar and, when a charge is received by the stop bar, it may remain in the retracted position. When the charge is removed, the stop bar(s) 311 may deploy from the retracted position to an extended position. In another implementation, the stop bar may be deployed when a charge is applied to the stop bar. When no charge is applied to the stop bar, the stop bar may remain in a retracted position.

In another example, the stop bar(s) may be controlled directly by the safety profile module 913 (FIG. 9) and deployed in response to a command, signal or charge being provided from the safety profile module to the stop bar(s). For example, the stop bar(s) 311 may be spring actuated and deployed in response to a signal from the safety profile module 913. In another implementation, the stop bar(s) may be deployed using air propulsion. For example, the stop bars may include a carbon dioxide cartridge that may be discharged in response to receiving a command or signal from the safety profile module 913. When discharged, it may cause the stop bar(s) to deploy from the retracted position to an extended position. In still another example, the stop bars may be transitioned from a retracted position to an extended position using one or more pistons, e.g., pneumatic, hydraulic, electronic, etc. When the piston is retracted, the stop bars are maintained in the retracted position. When the piston is extended, the stop bars are deployed to an extended position.

In some implementations, one or more of a stop bar, disengaging the shaft, disengaging the propeller, removing the current to the motor and/or reversing the current to the motor may be utilized to stop the rotation of a propeller. The stop bars, disengaging the rotating shaft, disengaging the propeller, current removal from the motor, and reversing the current to the motor are generally referred to herein as stopping members. In some implementations, to further reduce any potential harm to the object, the propeller blades may be hinged and/or have the ability to be re-oriented. For example, the propellers may have a hinge toward the middle of the propeller blades such that the propeller blades will deflect when contact with an object occurs. If the blades have the ability to be re-oriented, when a safety profile is executed, the blades may be re-oriented approximately ninety degrees so that the flat portion of the propeller is the leading portion/edge of the propeller, rather than an edge of the propeller blade.

In still another example, the propeller may include one or more weights positioned at or near the center of the propeller during normal operation. When a safety profile is executed, the weights may be deployed such that they move in an outward direction toward an end of the propeller blades. By moving the weights out to the perimeter of the propeller, the rotational speed of the propeller is reduced.

Figure 5:
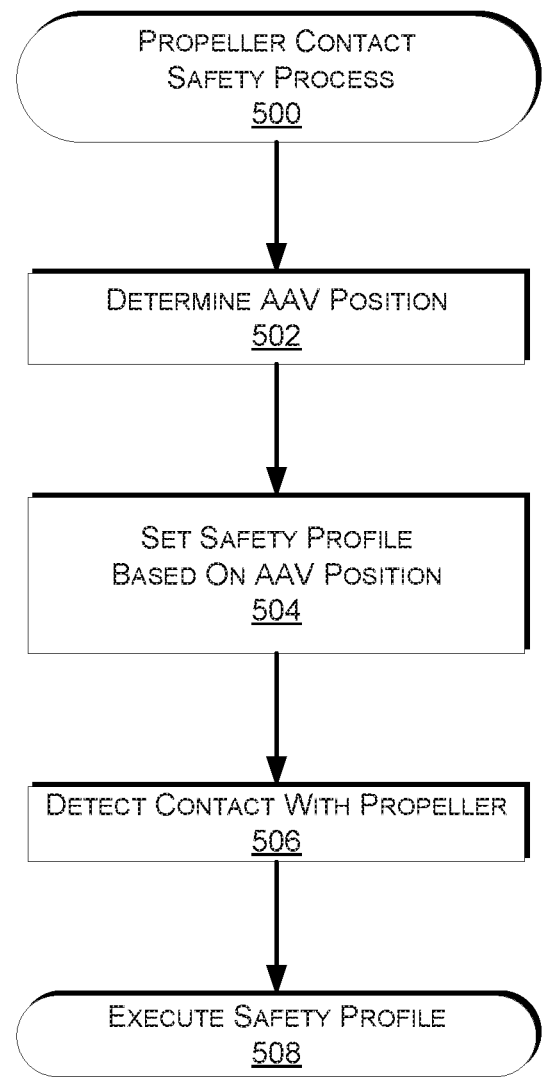
FIG. 5 is a flow diagram illustrating an example propeller contact safety process, according to an implementation.

FIG. 5 is a flow diagram illustrating an example propeller contact safety process 500, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process 500 begins by determining a position of the AAV, as in 502. For example, the navigation system 908 (FIG. 9) may include a location determining element, such as a global positioning satellite (GPS) system that can be used to determine the location of the AAV. The navigation system 908 may also be able to determine the altitude and/or speed of the AAV. In some implementations, the AAV may have information about the area in which the AAV is located (e.g., are there buildings, is it a secured area, such as a materials handling facility, whether the AAV is at an area populated by humans, such as a neighborhood). Information about the area surrounding the AAV may be stored in a memory of the AAV, provided to the AAV by other AAVs that have been or are in the area, provided by the AAV control system, etc.

Based on the determined AAV position, a safety profile may be selected for the AAV, as in 504. In this example, the safety profile may define an action or set of actions that are to be automatically performed if a contact with a propeller of the AAV is detected. In some implementations, the safety profile may vary based on the position of the AAV. Different safety profiles may include different actions that are to be performed by the AAV when a contact with a propeller is detected. For example, a first safety profile, also referred to herein as a near surface safety profile, may be defined in which the AAV shuts off all motors and stops rotation of all propellers of the AAV when a contact with any one of the propellers of the AAV is detected. Such a safety profile may be selected when the AAV is landed and/or near a surface (e.g., when the AAV is performing a landing or takeoff from the surface) on which it is capable of landing. In some implementations, the first safety profile may only be utilized when the AAV is landed or near a surface upon which it can land because stopping all the propellers will cause the AAV to lose the ability to maintain flight.

In a second safety profile, also referred to herein as a transition safety profile, the actions that are automatically performed in response to detecting a contact with a propeller by an object may include stopping the rotation of the propeller that detected the contact and, in some AAV configurations, stopping the rotation of adjacent propellers. For example, if the AAV has six or more propellers, the safety profile may cause the propeller that detected the contact with the object and the two propellers adjacent to the propeller that detected the contact with the object to stop rotating. If the AAV has only four propellers, the safety profile may only stop the one propeller that detected the contact with the object.

The actions of the selected safety profile may also include altering the rotation of one or more of the propellers that are not stopped in a manner that will cause the AAV to move or navigate away from the object and/or land the AAV on a nearby surface.

The transition safety profile may be selected when the AAV is transitioning from a takeoff to an open area or when the AAV is transitioning from an open area to a landing. In some implementations, the transition safety profile may also be used in other locations. For example, if the AAV is located in a controlled environment, such as a materials handling facility, it may utilize the transition safety profile while in the controlled environment. Likewise, if the AAV is in an area with multiple objects, an area known to often have objects and/or an area where contact with an object may be more likely, it may operate in a transition safety profile.

In still another example, a third safety profile, also referred to herein as an open area safety profile, may be selected. An open area safety profile may be selected when the AAV is in an area with no or few objects, at a high altitude, traveling at a high speed and/or in an area where an encounter with an object is not likely. For example, if the AAV is at an altitude of five hundred feet and traveling over a non-populated area, the AAV may utilize an open area safety profile. The open area safety profile may specify automatic actions of stopping the propeller that detected a contact with an object and altering the rotation of the propellers that were not stopped to navigate the AAV away from the object.

While the above examples identify three different safety profiles, in other implementations, additional or fewer safety profiles may be utilized with the implementations described herein. Likewise, the safety profiles may include fewer or additional actions that are automatically performed in response to detecting a contact with a propeller by an object. For example, the AAV may only be configured to automatically stop the rotation of a propeller when a contact with an object is detected.

Upon selection of a safety profile, the AAV may continuously monitor for a contact with a propeller of the AAV by an object, as in 506. For example, as discussed above, the propellers may be formed of an electrically conductive material and the conductance through the propeller or the capacitance of the propeller may be monitored. When a change in the conductance and/or capacitance is detected, it may be determined that the propeller has been contacted by an object. As another example, the force applied to the propellers may be monitored and, if the external forces exceed those that are typically encountered (e.g., wind), it may be determined that the propeller has been contacted by an object.

If it is determined that the propeller has been contacted by an object, the selected safety profile is automatically executed, as in 508. For example, if the first safety profile has been selected, upon detection of a contact, all of the propellers of the AAV may stop rotating, causing the AAV to drop to a surface. In addition, in some implementations, an audio output by the AAV may be initiated. For example, after the AAV propellers have stopped, the AAV may emit an audio signal that the AAV has stopped and is contacting the AAV control system. In another implementation, the AAV may provide an audio signal that includes contact information that an individual may utilize to provide a notification of the landed AAV. Any audio may be output by the AAV.

In still another implementation, the AAV may contact the AAV control system to notify the AAV control system of its location and that the safety profile has been executed.

Figure 6:
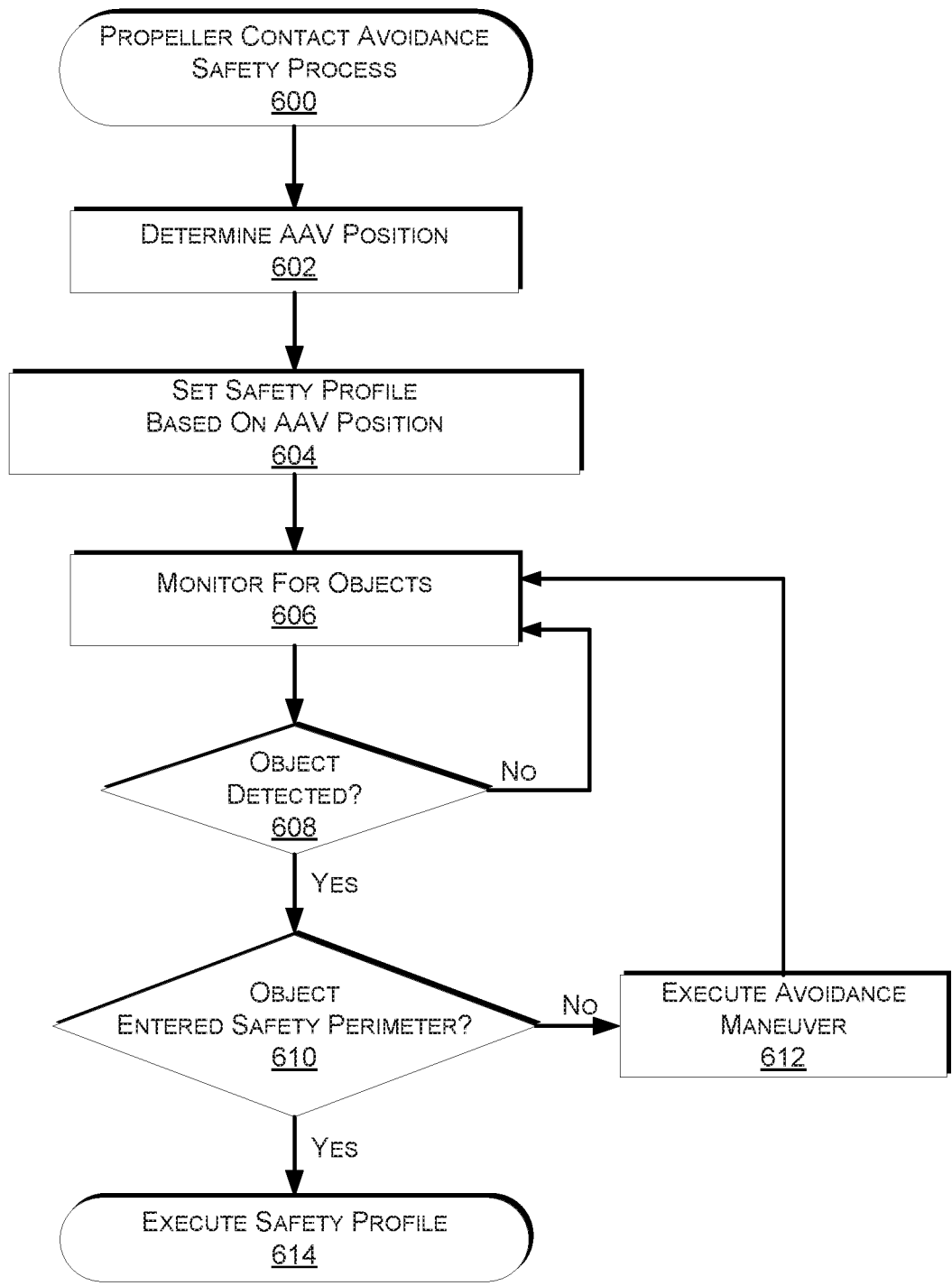
FIG. 6 is a flow diagram illustrating an example propeller contact avoidance safety process, according to an implementation.

FIG. 6 is a flow diagram illustrating an example propeller contact avoidance safety process 600, according to an implementation. The propeller contact avoidance process 600 begins by determining a position of the AAV, as in 602. For example, the navigation system 908 (FIG. 9) may include a location determining element, such as a global positioning satellite (GPS) system that can be used to determine the location of the AAV. The navigation system 908 may also be able to determine the altitude and/or speed of the AAV. In some implementations, the AAV may have information about the area in which the AAV is located (e.g., are there buildings, is it a secured area (such as a materials handling facility), is it an area populated by humans (such as a neighborhood)). Information about the area surrounding the AAV may be stored in a memory of the AAV, provided to the AAV by other AAVs that have been, or are in the area, provided by the AAV control system, etc.

Based on the determined AAV position, a safety profile may be selected for the AAV, as in 604. In this example, the safety profile may define an action or set of actions that are to be automatically performed if an object is detected, if an object enters a defined safety perimeter (also referred to as an imminent contact), and/or if a contact with a propeller of the AAV is detected. In some implementations, the safety profile may vary based on the position of the AAV. Different safety profiles may include different actions that are to be performed by the AAV when an object is detected, when an imminent contact with an object is detected, and/or when a contact with a propeller is detected. For example, a first safety profile, also referred to herein as a near surface safety profile, may be defined in which the AAV monitors for an object entering an expanded safety perimeter surrounding the propellers of the AAV and, if an object is detected entering the expanded safety perimeter, the AAV shuts off all motors and stops rotation of all propellers of the AAV. Such a safety profile may be selected when the AAV is landed and/or near a surface (e.g., when the AAV is performing a landing or takeoff from the surface) on which it is capable of landing. In some implementations, the first safety profile may only be utilized when the AAV is landed or near a surface upon which it can land because stopping all the propellers will cause the AAV to lose the ability to maintain flight.

In a second safety profile, also referred to herein as a transition safety profile, the AAV may continuously monitor for an object entering a transition safety perimeter. The transition safety perimeter may be a perimeter that extends farther away from the ends of the propeller than the contracted safety perimeter but less than the distance of the expanded safety perimeter. If an object is detected entering the transition safety perimeter, the rotation of the propeller nearest the detected object may be stopped. In some AAV configurations, the rotation of adjacent propellers may also be stopped. For example, if the AAV has six or more propellers, the safety profile may cause the propeller nearest the detected object and the two propellers adjacent to the propeller nearest the detected object to stop rotating. If the AAV has only four propellers, the safety profile may only stop the one propeller that is nearest the detected object, so that navigation control and flight may be maintained by the remaining three propellers.

The actions of the selected safety profile may also include altering the rotation of one or more of the propellers that were not stopped in a manner that will cause the AAV to move or navigate away from the detected object and/or land the AAV on a nearby surface.

The transition safety profile may be selected when the AAV is transitioning from a takeoff to an open area or when the AAV is transitioning from an open area to a landing. In some implementations, the transition safety profile may also be used in other locations. For example, if the AAV is located in a controlled environment, such as a materials handling facility, it may utilize the transition safety profile while in the controlled environment. Likewise, if the AAV is in an area with multiple objects, an area known to often have objects and/or an area where contact with an object may be more likely, it may operate in a transition safety profile.

In still another example, the third safety profile, also referred to herein as an open area safety profile, may be selected. An open area safety profile may be selected when the AAV is an area with no or few objects, at a high altitude, traveling at a high speed and/or in an area where an encounter with an object is not likely. For example, if the AAV is at an altitude of five hundred feet and traveling over a non-populated area, the AAV may utilize an open area safety profile. In the open area safety profile, the AAV may continuously monitor for an object entering a contracted safety perimeter, and the open area safety profile may specify automatic actions that are to be performed when an object is detected entering the contracted safety perimeter. For example, the automatic actions may include stopping the propeller that is nearest a detected object and altering the rotation of the propellers that are not stopped to navigate the AAV away from the object.

While the above examples identify three different safety profiles, in other implementations, additional or fewer safety profiles may be utilized with the implementations described herein. Likewise, the safety profiles may include fewer or additional actions that are automatically performed in response to detecting an object entering a safety perimeter.

Upon selection of a safety profile, the example process 600 may monitor for an object, as in 606. In some implementations, the example process 600 may monitor for any object that is detectable by one or more object detection components of the AAV. In another implementation, the example process 600 may only monitor for objects entering the safety perimeter specified for the selected safety profile.

As the example process monitors for objects, a determination is made as to whether an object has been detected, as in 608. If an object is not detected, the example process returns to block 606 and continues. However, if an object is detected, a determination is made as to whether the detected object has entered the safety perimeter specified by the safety profile, as in 610. For example, if the distance between the object and a propeller of the AAV is less than a safety perimeter distance from the propeller of the AAV, it is determined that the object has entered the safety perimeter.

If it is determined that the detected object has not yet entered the safety perimeter specified by the safety profile, one or more avoidance maneuvers may be performed in an effort to prevent the object from entering the safety perimeter, as in 612. For example, the rotation of the propellers may be altered to cause the AAV to navigate away from a position of the detected object. In another example, the AAV may stop movement and loiter at its current position, so that it can continue monitoring the position of the object. If the object continues to approach the AAV, the AAV may then navigate away from the position of the detected object. Navigation away from the detected object may include moving the AAV in a direction opposite the position of the detected object and/or moving in a direction that is farther away from a nearby surface. For example, if the object is potentially a human, pet or other animal that is approaching the AAV from the ground, in addition to moving away from the direction of the object, the AAV may move vertically away from the ground to further distance itself from the object and reduce the potential of a contact between the propeller of the AAV and the object.

If it is determined that the detected object has entered the safety perimeter of one of the propellers of the AAV, the selected safety profile is performed, as in 614. For example, if the first safety profile has been selected, upon detection of an object entering the contracted safety perimeter, all of the propellers of the AAV may stop rotating, causing the AAV to drop to a surface. In addition, in some implementations, an audio output by the AAV may be initiated. For example, after the AAV propellers have stopped, the AAV may emit an audio signal that the AAV has stopped and is contacting the AAV control system. In another implementation, the AAV may provide an audio signal that includes contact information that an individual may utilize to provide a notification of the grounded AAV. Any audio may be output by the AAV.

In still another implementation, the AAV may contact the AAV control system to notify the AAV control system of its location and that the safety profile has been executed.

Figure 7:
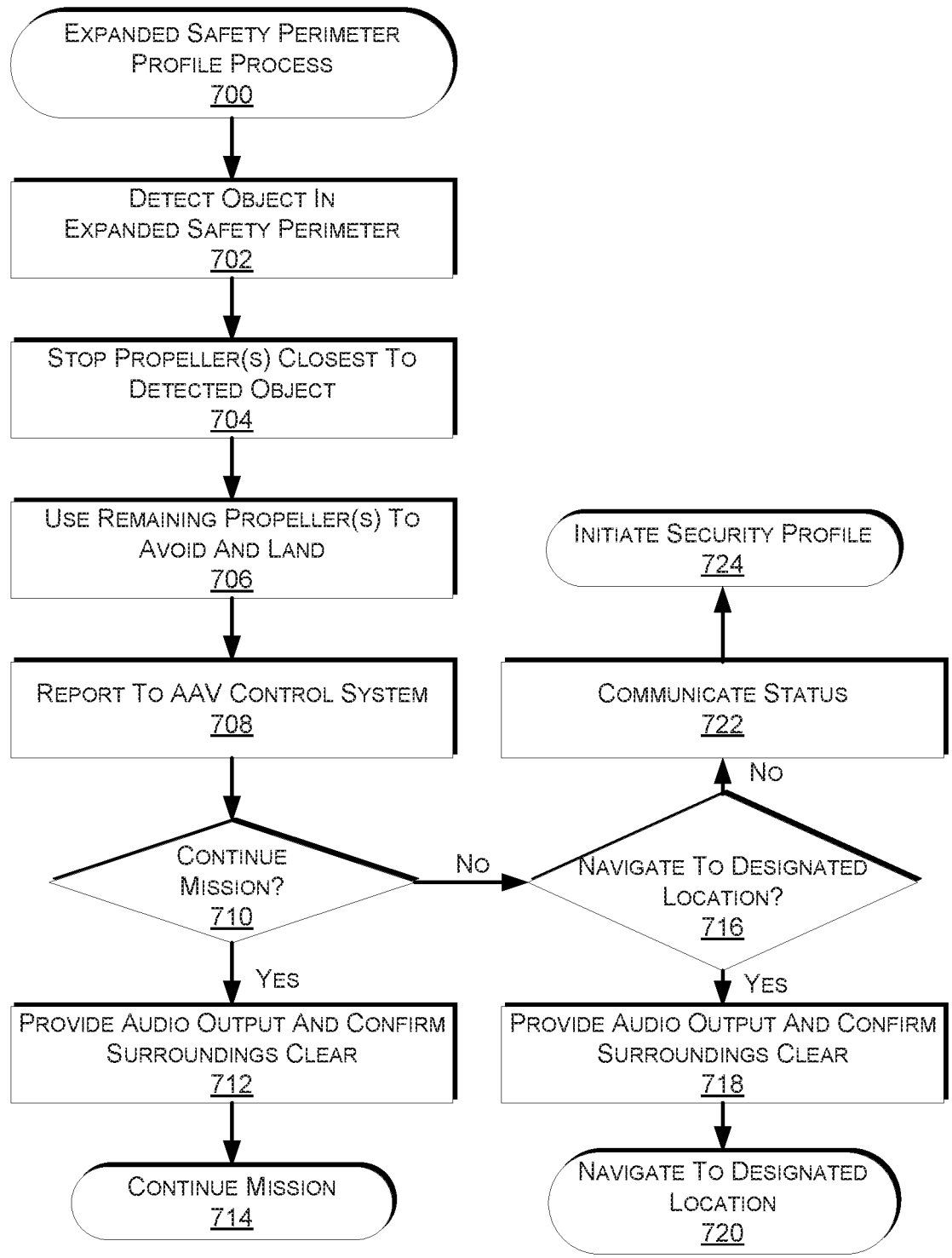
FIG. 7 is a flow diagram illustrating an example expanded safety perimeter profile process, according to an implementation.
Figure 8:
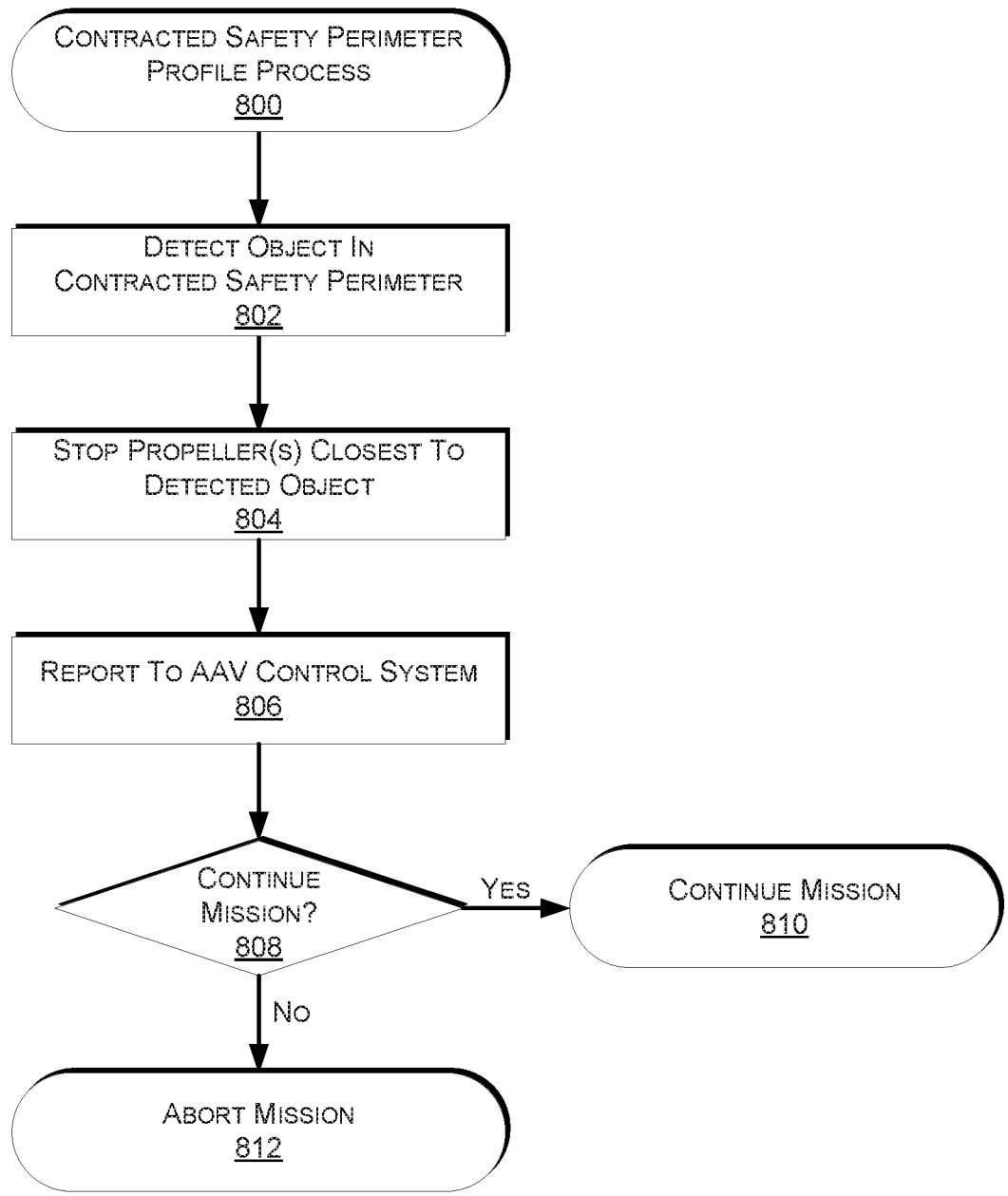
FIG. 8 is a flow diagram illustrating an example contracted safety perimeter profile process, according to an implementation.

As discussed above, object detection components may be used to monitor for objects entering a defined safety perimeter and different safety perimeters may be specified for different safety profiles. When an object is detected as entering a defined safety perimeter, a safety profile is automatically executed to reduce and/or avoid any contact or harm to the object. Multiple safety profiles and corresponding perimeters may be specified and used with the implementations discussed herein. FIGS. 7-8 provide examples of an expanded safety profile and a contracted safety profile that may be performed when an object is detected as entering an expanded safety perimeter or a contracted safety perimeter, respectively.

For example, FIG. 7 is a flow diagram illustrating an expanded safety perimeter profile process 700, according to an implementation. The example process 700 begins by detecting an object in an expanded safety perimeter, as in 702. For example, an object detection component may detect an object and determine a distance between the object and the object detection component. That information may be used to determine if the object has entered the expanded safety perimeter. When an object is determined to be within the expanded safety perimeter (an imminent contact), the rotation of the propeller(s) closest to the object may be stopped, as in 704. Likewise, the propellers that were not stopped may be used to navigate the AAV away from a position of the object and land the AAV on a nearby surface, as in 706. In addition to navigating away from the position of the object and landing the AAV, the AAV may also report to the AAV control system that the expanded safety profile has been executed, as in 708. The report to the AAV control system may include an identification of the AAV, the location of the AAV, information relating to the detected object, the position and/or altitude of the AAV, etc.

In some implementations, a determination may also be made as to whether the AAV should continue the mission (e.g., delivery of a package to a user specified location), as in 710. For example, after the AAV has landed, it may perform a self-check to confirm that no components of the AAV are malfunctioning, that the motors of the AAV are operating properly and that the propellers are intact and functional.

If it is determined that the AAV is to complete the mission, the AAV may provide an audio output notifying the surrounding area that it is preparing to take off and/or may confirm that the area surrounding the AAV is clear for takeoff, as in 712. For example, the object detection components may be used to determine if the object is still present and/or if there are any other objects near the AAV that may come into contact with a propeller of the AAV. After emitting an audio output and/or confirming that the surroundings are clear, the AAV may take off from its current location and continue its mission, as in 714. For example, if the mission is to deliver a package to a user specified location, the AAV may take off from its current location and continue navigating toward the user specified location.

Returning to decision block 710, if it is determined that the AAV is not to continue its mission, a determination is made as to whether the AAV is to navigate to a designated location, such as a relay location or a nearby materials handling facility, as in 716. If it is determined that the AAV is to navigate to a designated location, the AAV may provide an audio output notifying the surrounding area that it is preparing to take off and/or may confirm that the area surrounding the AAV is clear for takeoff, as in 718. For example, the object detection components may be used to determine if the object is still present and/or if there are any other objects near the AAV that may come into contact with a propeller of the AAV. After emitting an audio output and/or confirming that the surroundings are clear, the AAV may take off from its current location and navigate to a designated location, as in 720. The designated location may be any defined location and/or a location provided by the AAV control system. For example, in response to receiving a notification from the AAV that it has executed a safety profile, it may provide a designated location to the AAV and the AAV may navigate to the provided designated location.

If it is determined at decision block 716 that the AAV is not to navigate to a designated location, the AAV may communicate status information to the AAV control system, as in 722. The status information may include a position of the AAV, the payload carried by the AAV, images of the object that was detected near the AAV, an audio or video feed of the area surrounding the AAV, etc. Likewise, a security profile for the AAV may be initiated, as in 724. The security profile may be any procedures that are performed to protect the AAV and/or the payload carried by the AAV. For example, the security profile may include the AAV recording audio and/or video of the area surrounding the AAV, providing audio and/or video of the area surrounding the AAV to the AAV control system, providing a notification to a customer that was expecting a payload to be delivered by the AAV, emitting an audio signal or warning, and/or transmitting a beacon to enable retrieval of the AAV, etc.

FIG. 8 is a flow diagram illustrating an example contracted safety perimeter profile process 800, according to an implementation. The example contracted safety perimeter profile process 800 is similar to the expanded safety perimeter profile process but may have different actions that are automatically performed and/or may have a different safety perimeter specified for the contracted safety profile.

The example process 800 begins by detecting an object in a contracted safety perimeter, as in 802. For example, an object detection component may detect an object and determine a distance between the object and the object detection component. That information may be used to determine if the object has entered the contracted safety perimeter. When an object is determined to be within the contracted safety perimeter (imminent contact), the rotation of the propeller(s) closest to the object may be stopped, as in 804. In some implementations, the example process 800 may also utilize the propellers of the AAV that are not stopped to navigate the AAV away from the detected object. In comparison to the expanded safety perimeter profile, which may be selected when the AAV is at a low altitude and/or in an area where an object is likely to be encountered, the contracted safety perimeter profile may be selected when the AAV is at a high altitude, in an area where an encounter with an object is not expected, and/or in a controlled area, such as a materials handling facility.

In addition to stopping the propeller closest to the detected object, the AAV may also report to the AAV control system that the contracted safety profile has been executed, as in 806. The report to the AAV control system may include an identification of the AAV, the location of the AAV, information relating to the detected object, the position and/or altitude of the AAV, etc.

In some implementations, a determination may also be made as to whether the AAV should complete the mission, as in 808. For example, if the AAV did not contact the object, it may be determined that the AAV is to complete the mission, as in 810. However, if it is determined that the AAV did contact the object, it may be determined whether the AAV is capable of completing the mission. For example, it may be determined whether the propeller that contacted the object is still operational and/or whether other components of the AAV remain operational. If all components and the propeller remain operational, it may be determined that the AAV is to complete the mission. However, if the propeller and/or components of the AAV are not operational, it may be determined that the AAV is to abort the mission, as in 812. In some implementations, if a mission is aborted, the AAV may navigate to a designated location (e.g., a materials handling facility, relay location). In other implementations, if a mission is aborted, the AAV may land and report its position to the AAV control system and/or initiate a security profile, as described herein with respect to FIG. 7.

Figure 9:
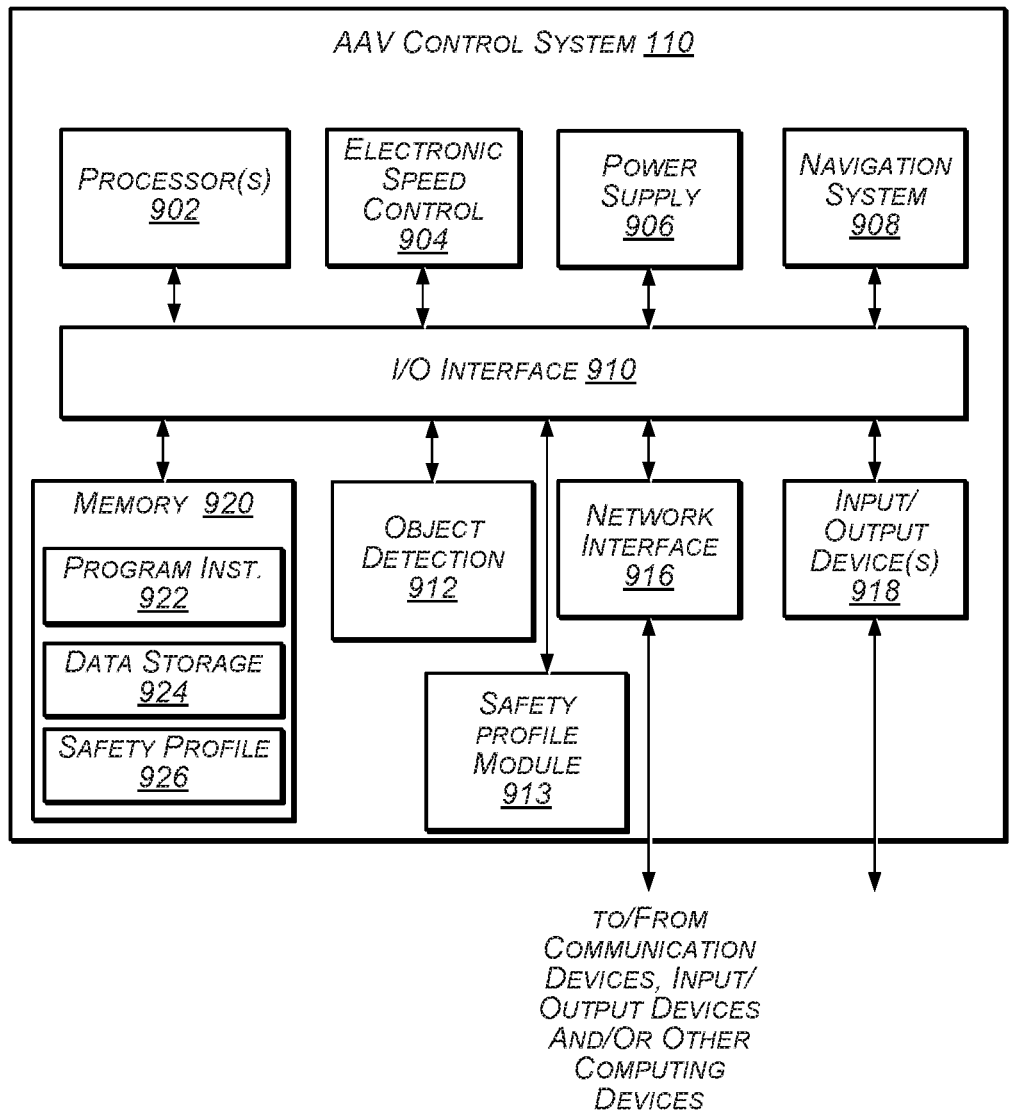
FIG. 9 is a block diagram illustrating various components of an automated aerial vehicle control system, according to an implementation.

FIG. 9 is a block diagram illustrating an example AAV control system 110 of the AAV 100. In various examples, the block diagram may be illustrative of one or more aspects of the AAV control system 110 that may be used to implement the various systems and methods discussed above. In the illustrated implementation, the AAV control system 110 includes one or more processors 902, coupled to a non-transitory computer readable storage medium 920 via an input/output (I/O) interface 910. The AAV control system 110 may also include ESCs 904, power supply module 906 and/or a navigation system 908. The AAV control system 110 further includes an object detection controller 912, a network interface 916, and one or more input/output devices 918.

In various implementations, the AAV control system 110 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, flight paths, safety profiles, and/or data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922, data storage 924 and safety profiles 926, respectively. In other implementations, program instructions, data and/or safety profiles may be received, sent or stored upon different types of computer-accessible media, such as non-transitory media, or on similar media separate from the non-transitory computer readable storage medium 920 or the AAV control system 110. Safety profiles may include, for example, avoidance maneuvers, safety perimeter information, automatic actions to be taken when a safety perimeter is entered by an object, automatic actions to take when a contact with a propeller occurs, etc.

Generally speaking, a non-transitory, computer readable storage medium may include storage media or memory media such as magnetic or optical media, e.g., disk or CD/DVD-ROM, coupled to the AAV control system 110 via the I/O interface 910. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The ESCs 904 communicate with the navigation system 908 and adjust the power of each propeller motor to guide the AAV along a determined flight path and/or to perform avoidance maneuvers. The navigation system 908 may include a GPS or other similar system than can be used to navigate the AAV to and/or from a location. The object detection controller 912 communicates with the object detection components, discussed above, and processes information received from the object detection components. For example, information received from the object detection components may be processed to detect a presence of an object, determine a position of the object with respect to the AAV, etc.

The AAV control system 110 may also include a safety profile module 913. The safety profile module may communicate with the object detection controller 912, the navigation system 908, the ESCs 904 and/or the stopping members discussed above. The safety profile module may select and/or execute the safety profiles, determine if an object has entered a safety perimeter and/or determine if a contact with a propeller by an object has occurred.

The network interface 916 may be configured to allow data to be exchanged between the AAV control system 110, other devices attached to a network, such as other computer systems, and/or with AAV control systems of other AAVs. For example, the network interface 916 may enable wireless communication between numerous AAVs. In various implementations, the network interface 916 may support communication via wireless general data networks, such as a Wi-Fi network. For example, the network interface 916 may support communication via telecommunications networks such as cellular communication networks, satellite networks, and the like.

Input/output devices 918 may, in some implementations, include one or more displays, image capture devices, thermal sensors, infrared sensors, time of flight sensors, accelerometers, pressure sensors, weather sensors, etc. Multiple input/output devices 918 may be present and controlled by the AAV control system 110. One or more of these sensors may be utilized to assist in the landing as well as to avoid obstacles during flight.

As shown in FIG. 9, the memory may include program instructions 922 which may be configured to implement the example processes and/or sub-processes described above. The data storage 924 may include various data stores for maintaining data items that may be provided for determining flight paths, identifying objects, generating avoidance maneuvers, retrieving inventory, landing, identifying a level surface for disengaging inventory, determining safety profiles, determining safety perimeters, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 110 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 110. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from AAV control system 110 may be transmitted to AAV control system 110 via transmission media or signals, such as electrical, electromagnetic, or digital signals, conveyed via a communication medium, such as a wireless link. Various implementations may further include receiving, sending or storing instructions and/or data implemented in accordance with the foregoing description upon a computer-accessible medium. Accordingly, the techniques described herein may be practiced with other AAV control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed, and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An automated aerial vehicle, comprising:
   a frame;
   a motor coupled to the frame;
   a propeller coupled to and rotated by the motor; and
   a controller configured to at least:
      select a safety profile from a plurality of safety profiles associated with the propeller, each safety profile being associated with a respective safety perimeter of the propeller that is different from respective safety perimeters associated with others of the plurality of safety profiles;
      detect an object within a selected respective safety perimeter associated with the selected safety profile of the propeller; and
      stop the propeller in response to detecting the object within the selected respective safety perimeter of the propeller.

2. The automated aerial vehicle of claim 1, wherein the controller is configured to detect the object within the selected respective safety perimeter of the propeller by detecting a contact between the propeller and the object.

3. The automated aerial vehicle of claim 2, wherein the controller is configured to detect the contact based at least in part on a force applied by the object to the propeller or to a pressure sensitive material included on the propeller.

4. The automated aerial vehicle of claim 1, wherein the controller is configured to stop the propeller by at least one of:
  disengaging the propeller from the motor connected with the propeller,
  disengaging a shaft that rotates the propeller from the motor connected with the propeller,
  releasing a clamp that secures the propeller to the motor,
  transitioning a weight to a perimeter of the propeller, or
  reorienting a blade of the propeller.

5. The automated aerial vehicle of claim 1, wherein the controller is further configured to at least:
  determine a position of the automated aerial vehicle, wherein the position is based at least in part on an altitude of the automated aerial vehicle or an area surrounding the automated aerial vehicle;
  wherein the controller is configured to select the safety profile from the plurality of safety profiles based at least in part on the determined position.

6. A computer-implemented method for stopping a rotation of a propeller of an automated aerial vehicle, comprising:
  under control of one or more computing systems configured with executable instructions,
    selecting a safety profile from a plurality of safety profiles associated with the propeller, each safety profile being associated with a respective safety perimeter of the propeller that is different from respective safety perimeters associated with others of the plurality of safety profiles;
    detecting an object entering a selected respective safety perimeter associated with the selected safety profile of the propeller of the automated aerial vehicle; and
    executing the selected safety profile in response to detecting the object entering the selected respective safety perimeter, wherein executing the selected safety profile includes stopping the rotation of the propeller.

7. The computer-implemented method of claim 6, further comprising:
  under control of one or more computing systems configured with executable instructions,
    determining a position of the automated aerial vehicle, wherein the position is based at least in part on an altitude of the automated aerial vehicle or an area surrounding the automated aerial vehicle;
    wherein the safety profile is selected from the plurality of safety profiles based at least in part on the determined position.

8. The computer-implemented method of claim 6, wherein the selected safety profile is based at least in part on a configuration of the automated aerial vehicle.

9. The computer-implemented method of claim 6, wherein the object is detected based at least in part on at least one of:
  a force applied by the object to the propeller or to a pressure sensitive material included on the propeller,
  a change in an expected position of the propeller,
  a change in propeller vibration, or
  a change in an audible characteristic of the propeller.

10. The computer-implemented method of claim 6, wherein the rotation of the propeller is stopped by at least one of:
  removing a current from a motor connected with the propeller,
  reversing a polarity of the current to the motor connected with the propeller,
  deploying a stop bar into a rotor of the motor connected with the propeller,
  disengaging the propeller from the motor connected with the propeller,
  disengaging a shaft that rotates the propeller from the motor connected with the propeller,
  releasing a clamp that secures the propeller to the motor,
  transitioning a weight to a perimeter of the propeller, or
  reorienting a blade of the propeller.

11. The computer-implemented method of claim 6, wherein the automated aerial vehicle includes a plurality of propellers, and wherein executing the selected safety profile further includes at least one of:
  stopping a second rotation of a second propeller adjacent to the propeller,
  stopping all propellers of the plurality of propellers of the automated aerial vehicle,
  landing the automated aerial vehicle,
  notifying an automated aerial vehicle control system that the selected safety profile has been executed,
  aborting a mission, or
  navigating to a defined location.

12. The computer-implemented method of claim 6, further comprising:
  under control of one or more computing systems configured with executable instructions,
    detecting the object prior to the object entering the selected respective safety perimeter associated with the selected safety profile of the propeller of the automated aerial vehicle; and
    executing an avoidance maneuver to move the automated aerial vehicle away from the object.

13. The computer-implemented method of claim 12, wherein the object is detected prior to the object entering the selected respective safety perimeter by at least one of:
  an ultrasonic ranging module,
  a laser rangefinder,
  a radar distance measurement module,
  a stadiametric based rangefinder,
  a parallax based rangefinder,
  a coincidence based rangefinder,
  a Lidar based rangefinder,
  a Sonar based rangefinder,
  a time-of-flight based rangefinder,
  a thermal imaging module,
  an infrared module, or
  a camera.

14. An aerial vehicle, comprising:
  a motor having a rotating shaft;
  a propeller coupled to the rotating shaft;
  a safety profile component configured to select a safety profile from a plurality of safety profiles associated with the propeller, each safety profile being associated with a respective safety perimeter of the propeller that is different from respective safety perimeters associated with others of the plurality of safety profiles;
  an object detection component configured to detect a presence of an object within a selected respective safety perimeter associated with the selected safety profile of the propeller; and
  a stopping member for stopping the propeller in response to detecting the presence of the object within the selected respective safety perimeter of the propeller.

15. The aerial vehicle of claim 14, further comprising:
a navigation component configured to determine a position of the aerial vehicle, wherein the position is based at least in part on an altitude of the aerial vehicle or an area surrounding the aerial vehicle;
wherein the safety profile component is configured to select the safety profile from the plurality of safety profiles based at least in part on the determined position.

16. The aerial vehicle of claim 14, wherein the object detection component comprises a pressure sensitive material included on the propeller to detect a force applied by the object to the propeller.

17. The aerial vehicle of claim 14, wherein the object detection component comprises an electronic speed control to detect at least one of:
a change in an expected position of the propeller, or
a force applied by the object to the propeller.

18. The aerial vehicle of claim 14, wherein the stopping member comprises a first portion of the rotating shaft coupled to the propeller, and a second portion of the rotating shaft coupled to the motor;
wherein the first portion and the second portion of the rotating shaft are configured to selectively disengage from each other to stop the propeller.

19. The aerial vehicle of claim 14, wherein the stopping member comprises at least one of a pin, clamp, or connector configured to disengage the propeller from the motor to stop the propeller.

20. The aerial vehicle of claim 14, wherein the stopping member comprises at least one of:
a hinge associated with the propeller to deflect or rotate at least a portion of the propeller, or
a weight that is deployable along a length of the propeller to stop the propeller.

* * * * *